US012564789B2

(12) United States Patent
Arya et al.

(10) Patent No.: US 12,564,789 B2
(45) Date of Patent: Mar. 3, 2026

(54) TUNING UPSCALING FOR EACH COMPUTER GAME OBJECT AND OBJECT PORTION BASED ON PRIORITY

(71) Applicant: Sony Interactive Entertainment Inc., Tokyo (JP)

(72) Inventors: Deepali Arya, San Mateo, CA (US); Jason Wang, San Mateo, CA (US)

(73) Assignee: Sony Interactive Entertainment Inc., Tokyo (JP)

( * ) Notice: Subject to any disclaimer, the term of this patent is extended or adjusted under 35 U.S.C. 154(b) by 263 days.

(21) Appl. No.: 18/482,726

(22) Filed: Oct. 6, 2023

(65) Prior Publication Data

US 2025/0114707 A1     Apr. 10, 2025

(51) Int. Cl.
*A63F 13/57* (2014.01)

(52) U.S. Cl.
CPC .......... *A63F 13/57* (2014.09); *A63F 2300/66* (2013.01); *A63F 2300/6692* (2013.01)

(58) Field of Classification Search
CPC .................. A63F 13/57; A63F 2300/66; A63F 2300/6692
USPC .......................................................... 463/31
See application file for complete search history.

(56) References Cited

U.S. PATENT DOCUMENTS

| | | | | |
|---|---|---|---|---|
| 9,007,362 B2 * | 4/2015 | Shuster | ..................... | G06F 3/00 |
| | | | | 345/473 |
| 10,362,290 B2 * | 7/2019 | Cole | ..................... | H04N 13/139 |
| 11,263,261 B2 * | 3/2022 | Xie | .......................... | G06F 16/73 |
| 12,034,785 B2 * | 7/2024 | Yerli | ....................... | G06F 3/011 |
| 2020/0294297 A1 | 9/2020 | Chaney | | |
| 2021/0086075 A1 | 3/2021 | Cockram | | |
| 2021/0146240 A1 | 5/2021 | Colenbrander | | |
| 2021/0245061 A1 | 8/2021 | Kaushik | | |

OTHER PUBLICATIONS

"International Search Report and Written Opinion", issued by the United States Patent and Trademark Office, as International Searching Authority for PCT Application No. PCT/US2024/049735 on Feb. 11, 2025, 13 pages.
"Invitation to Pay Additional Fees and, Where Applicable, Protest Fee", issued by the United States Patent and Trademark Office, as International Searching Authority for PCT Application No. PCT/US2024/049735 on Dec. 18, 2024, 3 pages.

* cited by examiner

*Primary Examiner* — Allen Chan
(74) *Attorney, Agent, or Firm* — Kilpatrick, Townsend & Stockton LLP

(57)     ABSTRACT

As understood herein, not all objects in a computer game are of equal priority. Given this recognition, present principles apply a range of spatial and temporal resolutions to various objects in the same game depending on the priority of the objects in the game.

20 Claims, 10 Drawing Sheets

Determine Object/ Region Priority In Frame    ~400

Determine Spatial And/ Or Temporal Resolution Based On Priority    ~402

Encode With Resolution(s)    ~404

Transmit And/ Or Store    ~406

TUNING UPSCALING FOR EACH COMPUTER GAME OBJECT AND OBJECT PORTION BASED ON PRIORITY

FIELD

The present application relates to technically inventive, non-routine solutions that are necessarily rooted in computer technology and that produce concrete technical improvements, and more specifically to tuning upscaling for each computer game object and object portion based on priority.

BACKGROUND

Streaming computer games over a network must often balance quality of service (QOS) against network concerns such as bandwidth and latency.

SUMMARY

As understood herein, not all objects in a computer game are of equal priority. Given this recognition, present principles apply a range of spatial and temporal resolutions in the same game depending on the priority of the objects in the game.

Accordingly, an apparatus includes at least one processor assembly configured to, responsive to a first object or region in a video having a first priority, encode the first object or region at a first frame rate. The processor assembly also is configured to, responsive to a second object or region in the video having a second priority, encode the second object or region at a second frame rate.

The video may includes, e.g., a computer game video.

In example embodiments the first priority is higher than the second priority and the first frame rate is faster than the second frame rate.

If desired, the processor assembly can be configured to cause transmission of the first and second objects or regions over a network after encoding.

In non-limiting implementations, the processor assembly can be configured to, responsive to the first object or region in the video having the first priority, encode the first object or region at a first resolution, and responsive to the second object or region in the video having the second priority, encode the second object or region at a second resolution.

In various examples, the processor assembly can be configured to determine at least the first priority at least on part by any one or more of: identifying that the first object or region is a target, identifying that the first object or region is being looked at by a player, identifying that the first object or region historically has been looked at by plural players, identifying that the first object or region is being interacted with by a computer game controller, identifying that the first object or region is a playable object, and identifying that the first object or region is signaled by a game engine as having the first priority. On the other hand, the processor assembly may be configured to determine at least the second priority by one or more of identifying that the first object or region is a statistics display region, and identifying that the first object or region comprises text.

In another aspect, an apparatus includes at least one computer medium that is not a transitory signal and that includes instructions executable by at least one processor assembly to, responsive to a first object or region in a video having a first priority, encode the first object or region at a first resolution. The processor assembly is configured to, responsive to a second object or region in the video having a second priority, encode the second object or region at a second resolution.

In another aspect, a method includes encoding a first object in a video having higher priority than a second object in the video at a first spatial and/or temporal resolution, and encoding the second object at a second spatial and/or temporal resolution lower than the first spatial and/or temporal resolution.

The details of the present disclosure, both as to its structure and operation, can be best understood in reference to the accompanying drawings, in which like reference numerals refer to like parts, and in which:

DETAILED DESCRIPTION

Figure 1:
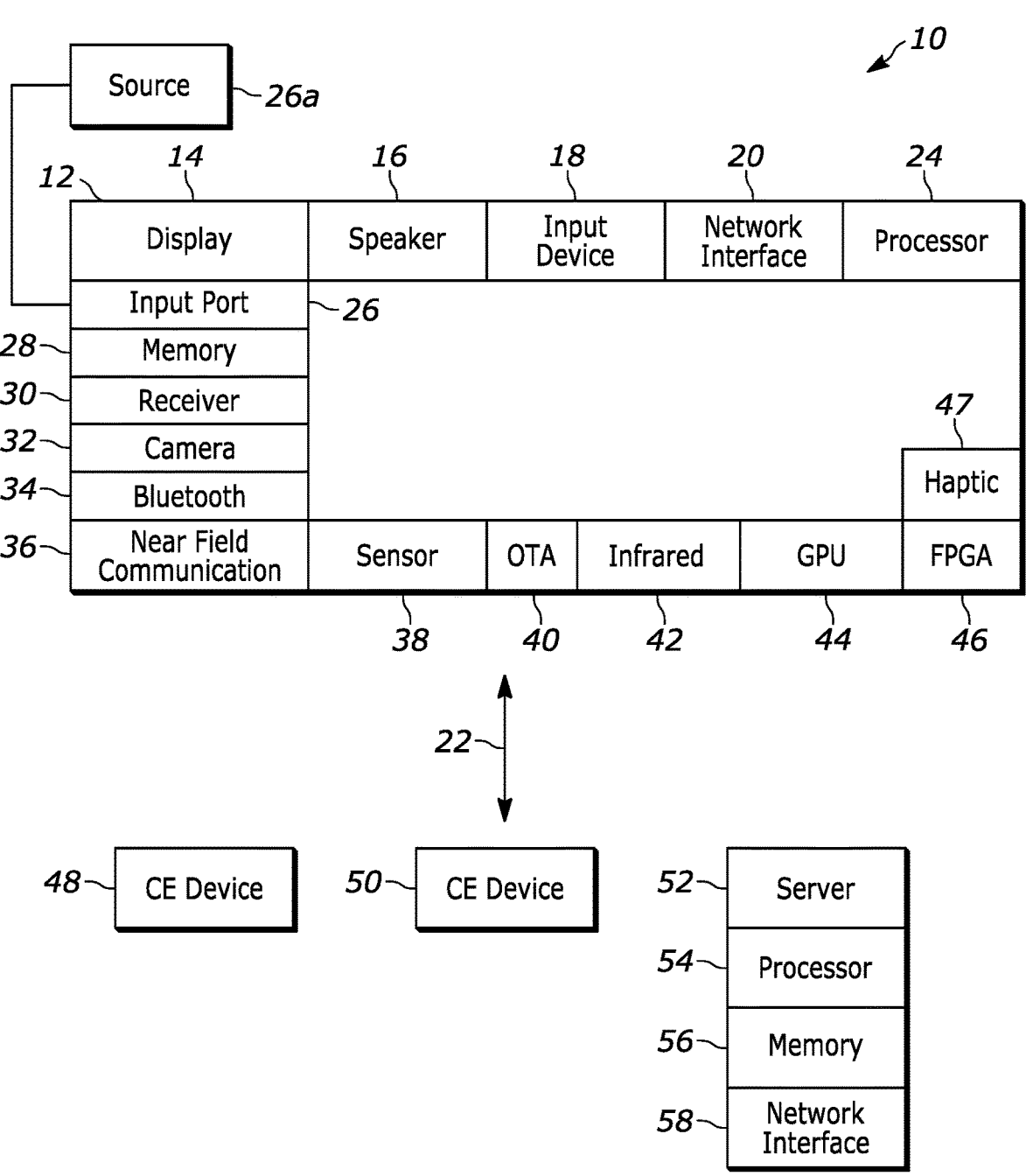
FIG. 1 is a block diagram of an example system including an example in consistent with present principles.

This disclosure relates generally to computer ecosystems including aspects of consumer electronics (CE) device networks such as but not limited to computer game networks. A system herein may include server and client components which may be connected over a network such that data may be exchanged between the client and server components. The client components may include one or more computing devices including game consoles such as Sony PlayStation® or a game console made by Microsoft or Nintendo or other manufacturer, extended reality (XR) headsets such as virtual reality (VR) headsets, augmented reality (AR) headsets, portable televisions (e.g., smart TVs, Internet-enabled TVs), portable computers such as laptops and tablet computers, and other mobile devices including smart phones and additional examples discussed below. These client devices may operate with a variety of operating environments. For example, some of the client computers may employ, as examples, Linux operating systems, operating systems from Microsoft, or a Unix operating system, or operating systems produced by Apple, Inc., or Google, or a Berkeley Software Distribution or Berkeley Standard Distribution (BSD) OS including descendants of BSD. These operating environments may be used to execute one or more browsing programs, such as a browser made by Microsoft or Google or Mozilla or other browser program that can access websites hosted by the Internet servers discussed below. Also, an operating environment according to present principles may be used to execute one or more computer game programs.

Servers and/or gateways may be used that may include one or more processors executing instructions that configure the servers to receive and transmit data over a network such as the Internet. Or a client and server can be connected over a local intranet or a virtual private network. A server or controller may be instantiated by a game console such as a Sony PlayStation®, a personal computer, etc.

Information may be exchanged over a network between the clients and servers. To this end and for security, servers and/or clients can include firewalls, load balancers, temporary storages, and proxies, and other network infrastructure for reliability and security. One or more servers may form an apparatus that implement methods of providing a secure community such as an online social website or gamer network to network members.

A processor may be a single- or multi-chip processor that can execute logic by means of various lines such as address lines, data lines, and control lines and registers and shift registers. A processor including a digital signal processor (DSP) may be an embodiment of circuitry. A processor assembly may include one or more processors.

Components included in one embodiment can be used in other embodiments in any appropriate combination. For example, any of the various components described herein and/or depicted in the Figures may be combined, interchanged, or excluded from other embodiments.

"A system having at least one of A, B, and C" (likewise "a system having at least one of A, B, or C" and "a system having at least one of A, B, C") includes systems that have A alone, B alone, C alone, A and B together, A and C together, B and C together, and/or A, B, and C together.

Referring now to FIG. 1, an example system 10 is shown, which may include one or more of the example devices mentioned above and described further below in accordance with present principles. The first of the example devices included in the system 10 is a consumer electronics (CE) device such as an audio video device (AVD) 12 such as but not limited to a theater display system which may be projector-based, or an Internet-enabled TV with a TV tuner (equivalently, set top box controlling a TV). The AVD 12 alternatively may also be a computerized Internet enabled ("smart") telephone, a tablet computer, a notebook computer, a head-mounted device (HMD) and/or headset such as smart glasses or a VR headset, another wearable computerized device, a computerized Internet-enabled music player, computerized Internet-enabled headphones, a computerized Internet-enabled implantable device such as an implantable skin device, etc. Regardless, it is to be understood that the AVD 12 is configured to undertake present principles (e.g., communicate with other CE devices to undertake present principles, execute the logic described herein, and perform any other functions and/or operations described herein).

Accordingly, to undertake such principles the AVD 12 can be established by some, or all of the components shown. For example, the AVD 12 can include one or more touch-enabled displays 14 that may be implemented by a high definition or ultra-high definition "4K" or higher flat screen. The touch-enabled display(s) 14 may include, for example, a capacitive or resistive touch sensing layer with a grid of electrodes for touch sensing consistent with present principles.

The AVD 12 may also include one or more speakers 16 for outputting audio in accordance with present principles, and at least one additional input device 18 such as an audio receiver/microphone for entering audible commands to the AVD 12 to control the AVD 12. The example AVD 12 may also include one or more network interfaces 20 for communication over at least one network 22 such as the Internet, an WAN, an LAN, etc. under control of one or more processors 24. Thus, the interface 20 may be, without limitation, a Wi-Fi transceiver, which is an example of a wireless computer network interface, such as but not limited to a mesh network transceiver. It is to be understood that the processor 24 controls the AVD 12 to undertake present principles, including the other elements of the AVD 12 described herein such as controlling the display 14 to present images thereon and receiving input therefrom. Furthermore, note the network interface 20 may be a wired or wireless modem or router, or other appropriate interface such as a wireless telephony transceiver, or Wi-Fi transceiver as mentioned above, etc.

In addition to the foregoing, the AVD 12 may also include one or more input and/or output ports 26 such as a high-definition multimedia interface (HDMI) port or a universal serial bus (USB) port to physically connect to another CE device and/or a headphone port to connect headphones to the AVD 12 for presentation of audio from the AVD 12 to a user through the headphones. For example, the input port 26 may be connected via wire or wirelessly to a cable or satellite source 26a of audio video content. Thus, the source 26a may be a separate or integrated set top box, or a satellite receiver. Or the source 26a may be a game console or disk player containing content. The source 26a when implemented as a game console may include some or all of the components described below in relation to the CE device 48.

The AVD 12 may further include one or more computer memories/computer-readable storage media 28 such as disk-based or solid-state storage that are not transitory signals, in some cases embodied in the chassis of the AVD as stand-alone devices or as a personal video recording device (PVR) or video disk player either internal or external to the chassis of the AVD for playing back AV programs or as removable memory media or the below-described server. Also, in some embodiments, the AVD 12 can include a position or location receiver such as but not limited to a cellphone receiver, GPS receiver and/or altimeter 30 that is configured to receive geographic position information from a satellite or cellphone base station and provide the information to the processor 24 and/or determine an altitude at which the AVD 12 is disposed in conjunction with the processor 24.

Continuing the description of the AVD 12, in some embodiments the AVD 12 may include one or more cameras 32 that may be a thermal imaging camera, a digital camera such as a webcam, an IR sensor, an event-based sensor, and/or a camera integrated into the AVD 12 and controllable by the processor 24 to gather pictures/images and/or video in accordance with present principles. Also included on the AVD 12 may be a Bluetooth® transceiver 34 and other Near Field Communication (NFC) element 36 for communication with other devices using Bluetooth and/or NFC technology, respectively. An example NFC element can be a radio frequency identification (RFID) element.

Further still, the AVD 12 may include one or more auxiliary sensors 38 that provide input to the processor 24. For example, one or more of the auxiliary sensors 38 may include one or more pressure sensors forming a layer of the touch-enabled display 14 itself and may be, without limitation, piezoelectric pressure sensors, capacitive pressure sensors, piezoresistive strain gauges, optical pressure sensors, electromagnetic pressure sensors, etc. Other sensor examples include a pressure sensor, a motion sensor such as an accelerometer, gyroscope, cyclometer, or a magnetic sensor, an infrared (IR) sensor, an optical sensor, a speed and/or cadence sensor, an event-based sensor, a gesture sensor (e.g., for sensing gesture command). The sensor 38 thus may be implemented by one or more motion sensors, such as individual accelerometers, gyroscopes, and magnetometers and/or an inertial measurement unit (IMU) that typically includes a combination of accelerometers, gyroscopes, and magnetometers to determine the location and orientation of the AVD 12 in three dimension or by an event-based sensors such as event detection sensors (EDS). An EDS consistent with the present disclosure provides an output that indicates a change in light intensity sensed by at least one pixel of a light sensing array. For example, if the light sensed by a pixel is decreasing, the output of the EDS may be −1; if it is increasing, the output of the EDS may be a +1. No change in light intensity below a certain threshold may be indicated by an output binary signal of 0.

The AVD 12 may also include an over-the-air TV broadcast port 40 for receiving OTA TV broadcasts providing input to the processor 24. In addition to the foregoing, it is noted that the AVD 12 may also include an infrared (IR) transmitter and/or IR receiver and/or IR transceiver 42 such as an IR data association (IRDA) device. A battery (not shown) may be provided for powering the AVD 12, as may be a kinetic energy harvester that may turn kinetic energy into power to charge the battery and/or power the AVD 12. A graphics processing unit (GPU) 44 and field programmable gated array 46 also may be included. One or more haptics/vibration generators 47 may be provided for generating tactile signals that can be sensed by a person holding or in contact with the device. The haptics generators 47 may thus vibrate all or part of the AVD 12 using an electric motor connected to an off-center and/or off-balanced weight via the motor's rotatable shaft so that the shaft may rotate under control of the motor (which in turn may be controlled by a processor such as the processor 24) to create vibration of various frequencies and/or amplitudes as well as force simulations in various directions.

A light source such as a projector such as an infrared (IR) projector also may be included.

In addition to the AVD 12, the system 10 may include one or more other CE device types. In one example, a first CE device 48 may be a computer game console that can be used to send computer game audio and video to the AVD 12 via commands sent directly to the AVD 12 and/or through the below-described server while a second CE device 50 may include similar components as the first CE device 48. In the example shown, the second CE device 50 may be configured as a computer game controller manipulated by a player or a head-mounted display (HMD) worn by a player. The HMD may include a heads-up transparent or non-transparent display for respectively presenting AR/MR content or VR content (more generally, extended reality (XR) content). The HMD may be configured as a glasses-type display or as a bulkier VR-type display vended by computer game equipment manufacturers.

In the example shown, only two CE devices are shown, it being understood that fewer or greater devices may be used. A device herein may implement some or all of the components shown for the AVD 12. Any of the components shown in the following figures may incorporate some or all of the components shown in the case of the AVD 12.

Now in reference to the afore-mentioned at least one server 52, it includes at least one server processor 54, at least one tangible computer readable storage medium 56 such as disk-based or solid-state storage, and at least one network interface 58 that, under control of the server processor 54, allows for communication with the other illustrated devices over the network 22, and indeed may facilitate communication between servers and client devices in accordance with present principles. Note that the network interface 58 may be, e.g., a wired or wireless modem or router, Wi-Fi transceiver, or other appropriate interface such as, e.g., a wireless telephony transceiver.

Accordingly, in some embodiments the server 52 may be an Internet server or an entire server "farm" and may include and perform "cloud" functions such that the devices of the system 10 may access a "cloud" environment via the server 52 in example embodiments for, e.g., network gaming applications. Or the server 52 may be implemented by one or more game consoles or other computers in the same room as the other devices shown or nearby.

The components shown in the following figures may include some or all components shown in herein. Any user interfaces (UI) described herein may be consolidated and/or expanded, and UI elements may be mixed and matched between UIs.

Present principles may employ various machine learning models, including deep learning models. Machine learning models consistent with present principles may use various algorithms trained in ways that include supervised learning, unsupervised learning, semi-supervised learning, reinforcement learning, feature learning, self-learning, and other forms of learning. Examples of such algorithms, which can be implemented by computer circuitry, include one or more neural networks, such as a convolutional neural network (CNN), a recurrent neural network (RNN), and a type of RNN known as a long short-term memory (LSTM) network. Generative pre-trained transformers (GPTT) also may be used. Support vector machines (SVM) and Bayesian networks also may be considered to be examples of machine learning models. In addition to the types of networks set forth above, models herein may be implemented by classifiers.

As understood herein, performing machine learning may therefore involve accessing and then training a model on training data to enable the model to process further data to make inferences. An artificial neural network/artificial intelligence model trained through machine learning may thus include an input layer, an output layer, and multiple hidden layers in between that that are configured and weighted to make inferences about an appropriate output.

Figure 2:
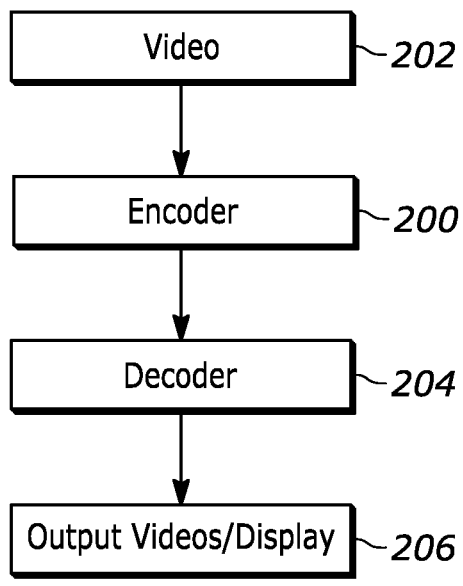
FIG. 2 illustrates an example encoder-decoder system.

FIG. 2 illustrates a system that includes a video encoder 200 for encoding/compressing videos 202. A video decoder 204 can receive the encoded videos and decode/decompress them into output videos 206.

Figure 3:
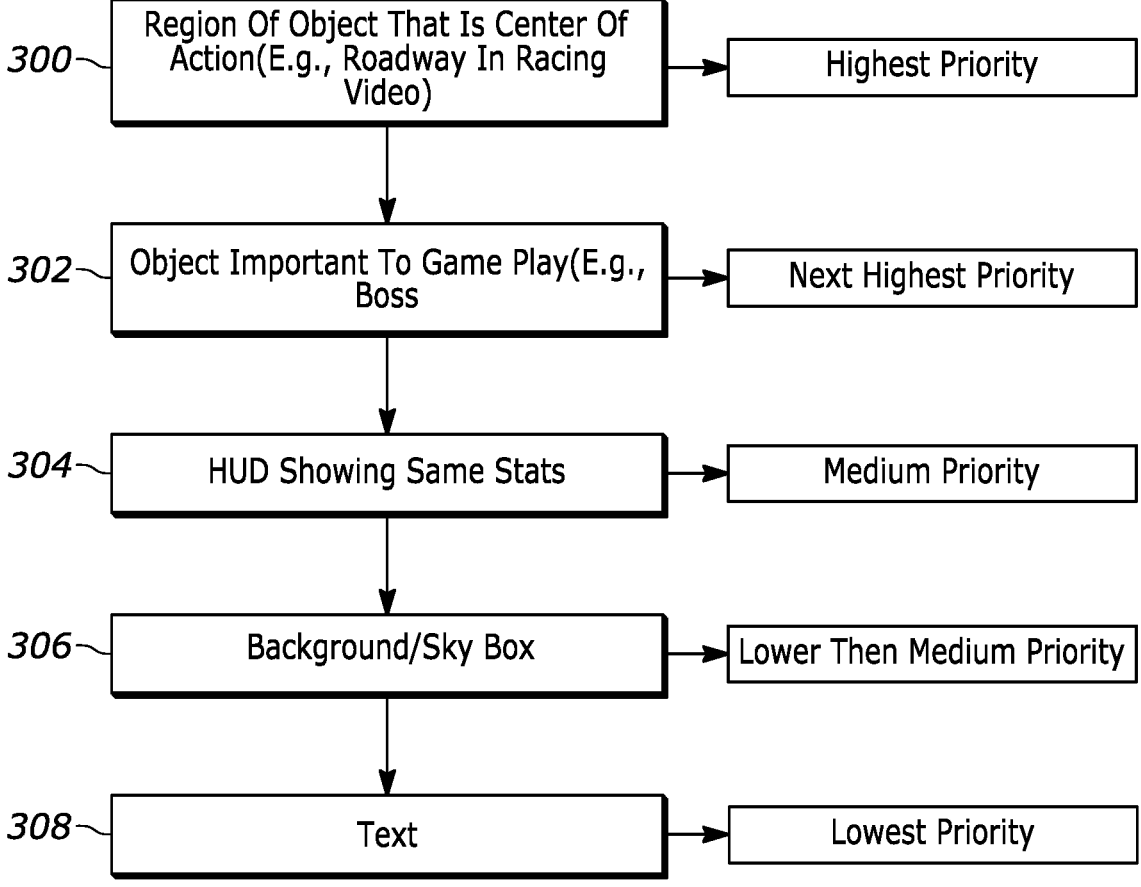
FIG. 3 schematically illustrates a video scene with video objects or frame regions ranked in order of their importance.

FIG. 3 schematically shows example video objects in a video frame and/or video regions in a video frame with associated priorities for encoding. For instance, an object or region 300 that is at the center of action in the video, such as the road in a racing game video, may be accorded the highest priority and consequently be encoded with a highest spatial resolution (e.g., 4K) and/or highest temporal resolution (frame rate) (e.g., 60 frames per second (FPS)). On the other hand, an object or region 302 that is of importance to game play, such as a boss character, but a little less important than the object or region 300, may be accorded the next-highest priority and consequently be encoded with a next-highest spatial resolution (e.g., 2K) and/or next highest temporal resolution (e.g., 30 FPS).

Still further, an object or region 304 that is of lesser importance to game play, such as heads-up display region showing game statistics, may be accorded the next-highest priority and consequently be encoded with a next-highest spatial resolution (e.g., HD) and/or next highest temporal resolution (e.g., 10 FPS). Yet again, an even lower priority object or region 306 such as background regions/skybox regions of a computer region may be associated with a priority corresponding to 5 FPS and SD, whereas a lowest priority object or region 308 such as text may be refreshed only once per second and encoded in SD.

Figure 4:
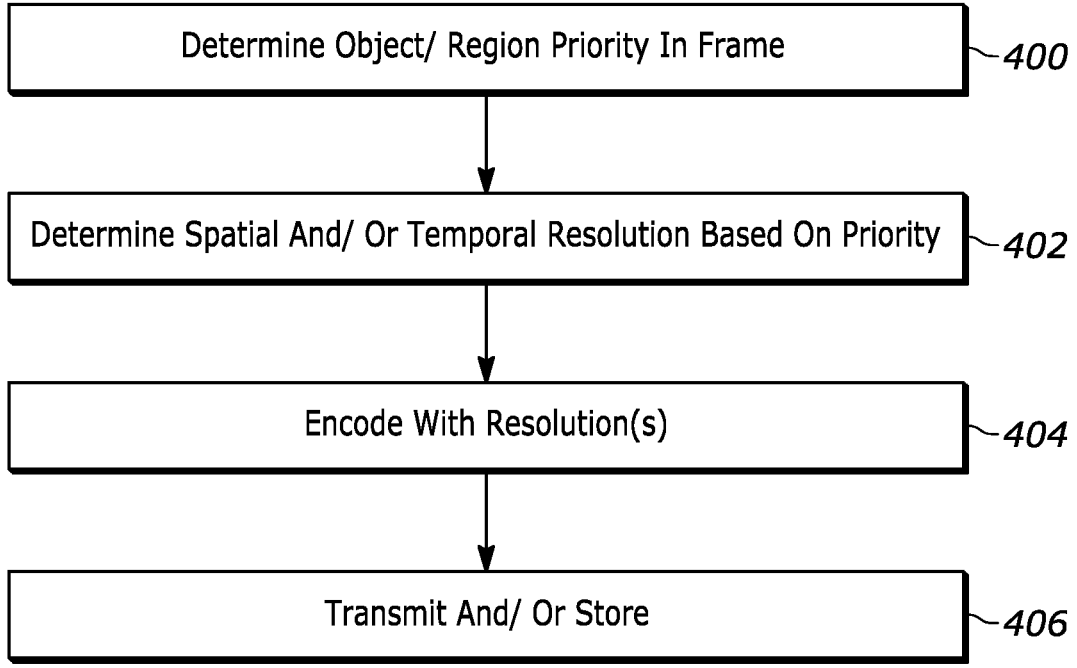
FIG. 4 illustrates example overall logic in example flow chart format for encoding different objects in the same code using different spatial and/or temporal resolutions.

FIG. 4 illustrates the above concept further in flow chart format. Commencing at state 400 the priority is determined for each object and/or region in a frame. This is correlated to a spatial and/or temporal resolution at state 402, with which the respective objects/regions are encoded at state 404 for transmission and/or storage at state 406.

Figure 5:
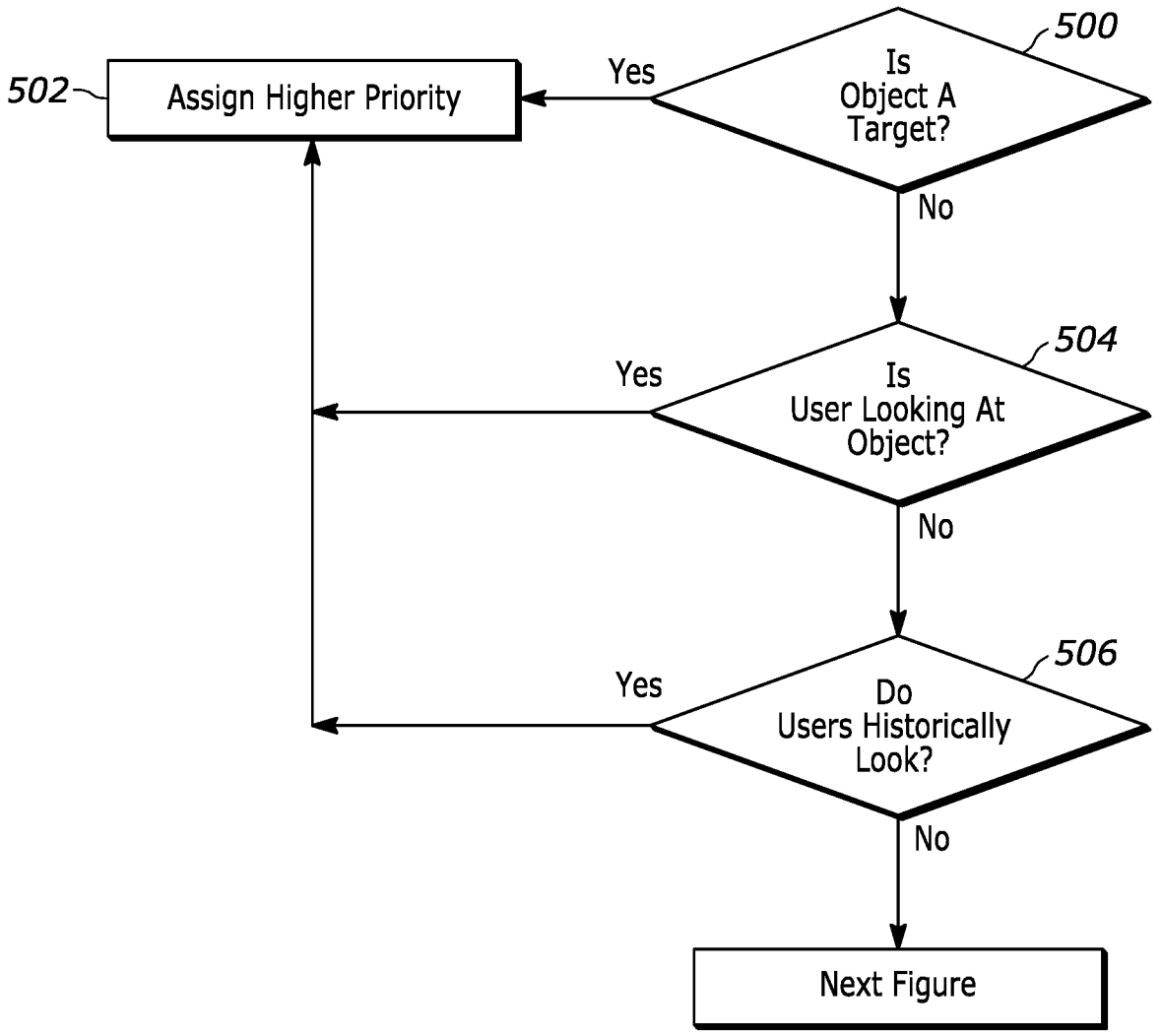
FIGS. 5 and 6 illustrate example logic in example flow chart format for determining priority of an object or region of a frame in a computer game.
Figure 6:
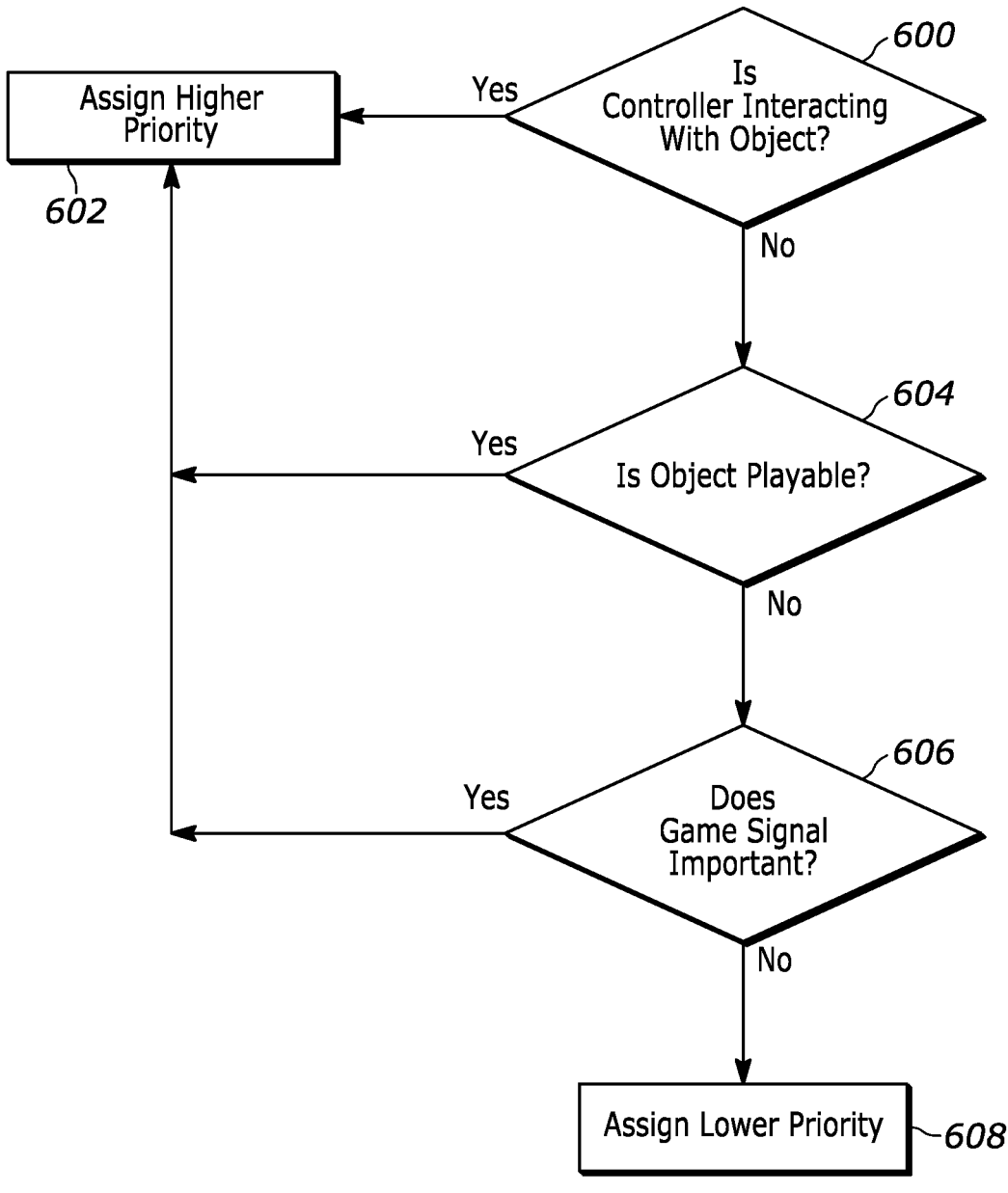

FIGS. 5 and 6 also illustrate the above concept further in flow chart format. Commencing at state 500 a series of identifications are used in an example system having only two priorities, low and high, in which a higher priority is assigned at state 502 to objects that are targets (500), objects the user is looking at as determined by gaze detection cameras and software (504), objects users historically looked at during the portion of the video under test as determined by gaze detection cameras and software (506), objects being interacted with by a computer game controller (600), objects that are playable by a gamer (604), and objects signaled by the game engine as being high priority (606). Other objects are assigned a lower priority at state 608.

Figure 7:
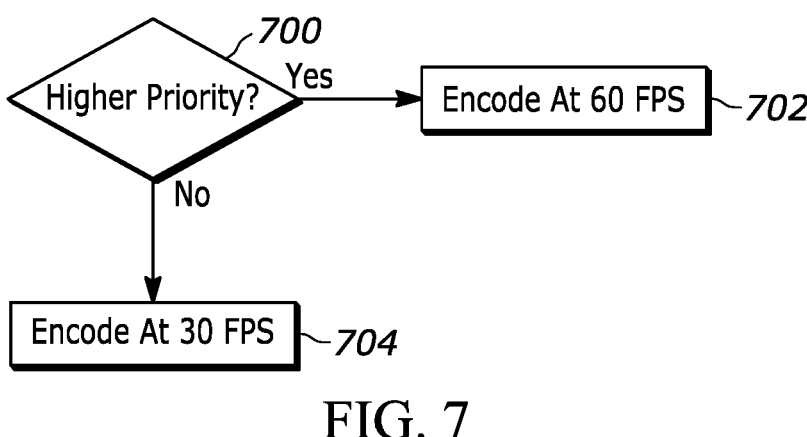
FIG. 7 illustrates example logic in example flow chart format for variable temporal resolution encoding.

FIG. 7 illustrates at state 700 that if an object or region is identified as a higher priority object or region, it may be encoded at state 702 at a relatively high temporal resolution, e.g., 60 FPS. In contrast, lower priority objects/regions may be encoded at state 704 at a lower temporal resolution, e.g., 30 FPS.

Figure 8:
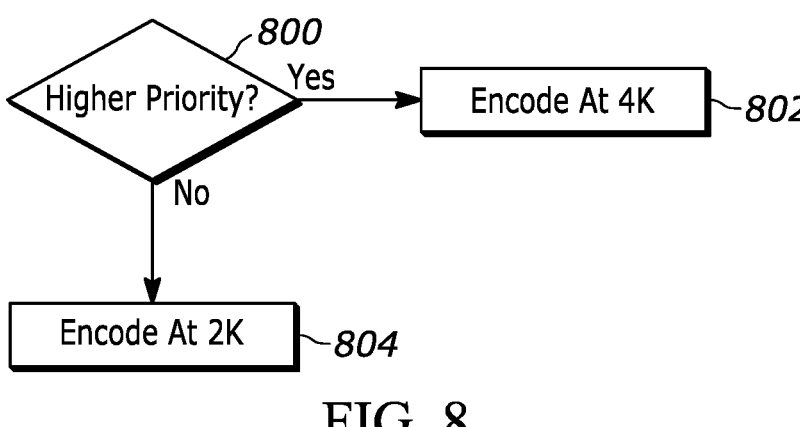
FIG. 8 illustrates example logic in example flow chart format for variable spatial resolution encoding.

FIG. 8 illustrates that in addition or alternatively, at state 800 that if an object or region is identified as a higher priority object or region, it may be encoded at state 802 at a relatively high spatial resolution, e.g., 4K. In contrast, lower priority objects/regions may be encoded at state 804 at a lower temporal resolution, e.g., 2K.

Figure 9:
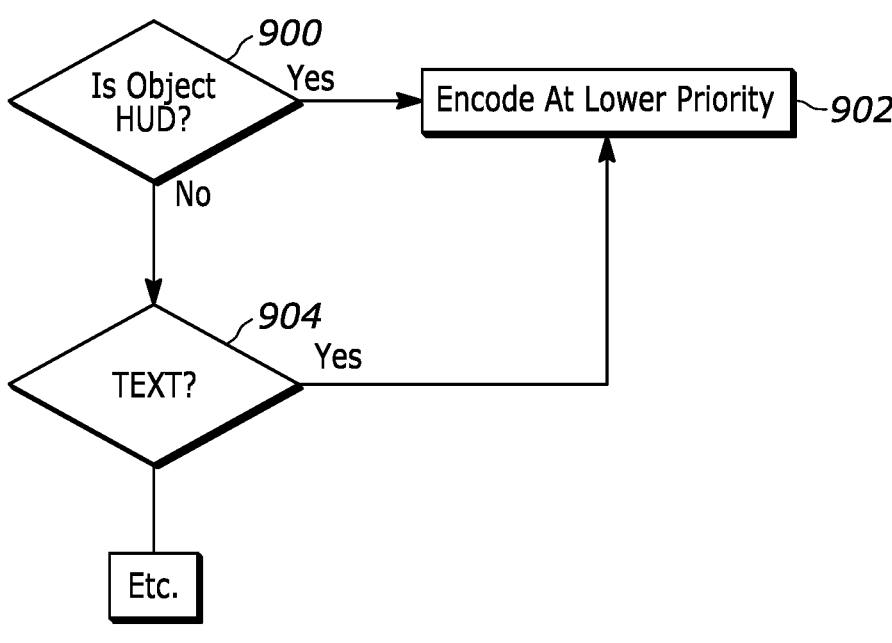
FIG. 9 illustrates example alternate logic in example flow chart format for determining priority of an object or region of a frame in a computer game.

FIG. 9 provides an example in which if an object is identified as a relatively low priority object/region such as a heads-up display statistics region (900) or text (904), it may be encoded at lower priority resolution at state 902.

Figure 10:
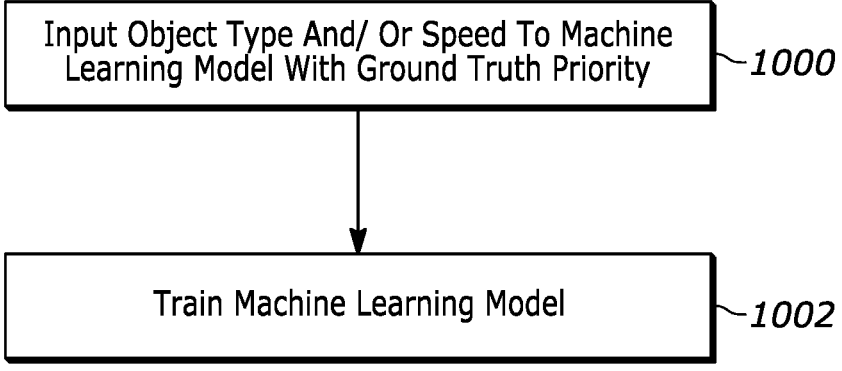
FIGS. 10 and 11 illustrate example logic in example flow chart format for training and using a machine learning (ML) model to determine priority.
Figure 11:
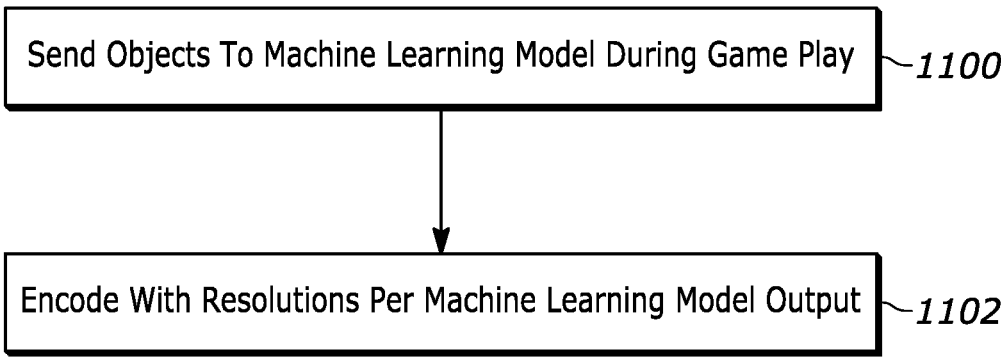

FIGS. 10 and 11 illustrate machine learning (ML)-based techniques consistent with present principles. Object/region types and/or speeds are input at state 1000 to a ML model along with ground truth priority to train the model at state 1002. Once trained, the ML model may be used as shown in FIG. 11. At state 1100 objects/regions in a video frame are sent to the ML model during video play along with their speeds if desired. The ML model outputs a priority and/or its equivalent encoding parameters, which are used at state 1102 to encode the objects/regions.

Figure 12:
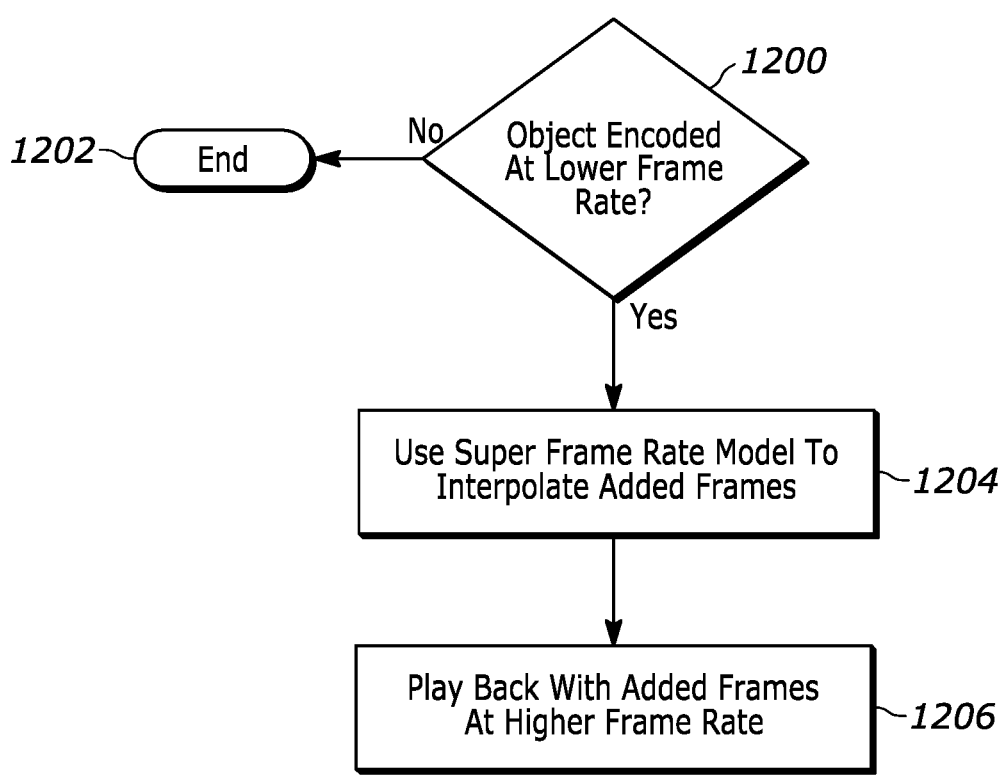
FIG. 12 illustrates example decoder side logic in example flow chart format for increasing temporal resolution of an object or region.

FIG. 12 illustrates example non-limiting decoder side logic that may be used to, e.g., recover frame rate when an object is encoded at a relatively low frame rate. If it is determined that an object or region received from a transmitter over a network is not encoded at a lower frame rate, e.g., as indicated by signaling from the transmitter indicating the frame rate for the object, the logic ends at state 1202, but otherwise the logic moves to state 1204 to use a super frame rate model to interpolate additional frames of the object between adjacent images of the object as received from the transmitter. Then at state 1206 the object is played back with the added frames at a higher frame rate than it was encoded with. Note that this technique may be used only on higher priority objects/regions to avoid diminishing latency.

Figure 13:
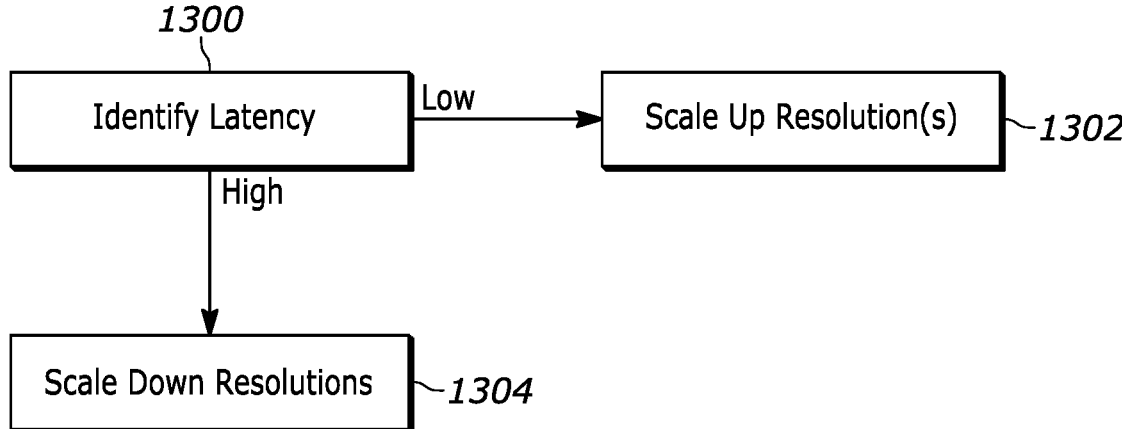
FIG. 13 illustrates example logic in example flow chart format for dynamically changing encoding resolution based on latency.
Figure 14:
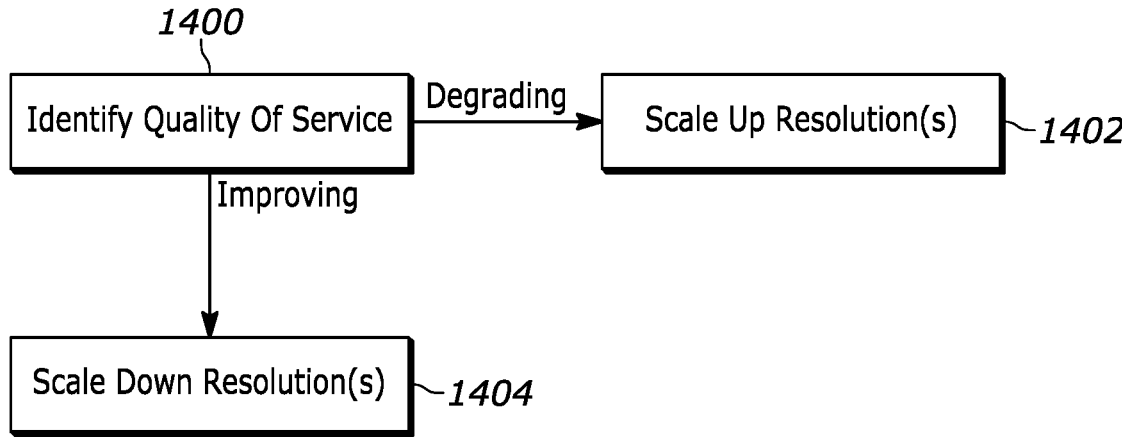
FIG. 14 illustrates example logic in example flow chart format for dynamically changing encoding resolution based on QoS.

FIGS. 13 and 14 illustrate how encoding resolutions may dynamically change. Commencing at state 1300 in FIG. 13, network latency is identified. If latency is low and/or decreasing, spatial and/or temporal resolutions used for all objects/regions may be increased at state 1302 regardless of priority Or, only higher priority objects/regions may have their resolution(s) increased at state 1302. On the other hand, if latency is high and/or increasing, spatial and/or temporal resolutions used for all objects/regions may be decreased at state 1304 regardless of priority Or, only lower priority objects/regions may have their resolution(s) decreased at state 1304. If desired, the logic above may be flipped, i.e., high latency can result in a logic flow to state 1302 while low latency can result in a logic flow to state 1304.

Commencing at state 1400 in FIG. 14, quality of service (QOS) of the network is identified. If QoS is low and/or degrading, spatial and/or temporal resolutions used for all objects/regions may be increased at state 1402 regardless of priority Or, only higher priority objects/regions may have their resolution(s) increased at state 1402. On the other hand, if QoS is high and/or improving, spatial and/or temporal resolutions used for all objects/regions may be decreased at state 1404 regardless of priority. Or, only lower priority objects/regions may have their resolution(s) decreased at state 1404. If desired, the logic above may be flipped, i.e., improving QoS can result in a logic flow to state 1402 while degrading QoS can result in a logic flow to state 1404.

Present techniques may be implemented by segmenting each frame by its objects/regions, and sending different parts of a frame with different frame rates. The different parts can be overlaid on each other at the receiver. Object level encoding may be used for improving latency such that only part of a full frame may be encoded at a high frame rate and other parts encoded at lower frame rates.

While particular techniques are herein shown and described in detail, it is to be understood that the subject matter which is encompassed by the present application is limited only by the claims.

What is claimed is:

1. An apparatus comprising:
at least one processor; and
at least one computer readable storage medium storing instructions which, when executed by the at least one processor, causes the apparatus to perform operations comprising:
accessing a plurality of video frames of a video;
analyzing a video frame of the plurality of video frames to identify a plurality of objects in the video frame;
determining, for each respective object of the plurality of objects, a respective priority level for the respective object, wherein determining the respective priority level for the respective object comprises determining that a first object in the video frame has a first priority level and determining that a second object in the video frame has a second priority level lower than the first priority level;
encoding frames of the plurality of video frames that include the first object at a first frame rate and frames of the plurality of video frames that include the second object at a second frame rate lower than the first frame rate; and transmitting the video to a client device according to the first frame rate and second frame rate.

2. The apparatus of claim 1, wherein the video comprises a computer game video.

3. The apparatus of claim 1, wherein the first frame rate is faster than the second frame rate.

4. The apparatus of claim 1, wherein the operations further comprise:

causing transmission of the first and second objects or regions over a network after encoding.

5. The apparatus of claim 1, wherein the operations further comprise:

encoding frames of the plurality of video frames that include the first object at a first resolution and frames of the plurality of video frames that include the second object at a second resolution.

6. The apparatus of claim 1, wherein determining that the first object has the first priority level comprises:

identifying that the first object or region is a target.

7. The apparatus of claim 1, wherein determining that the first object has the first priority level comprises:

identifying that the first object is being looked at by a player.

8. The apparatus of claim 1, wherein determining that the first object has the first priority level comprises:

identifying that the first object historically has been looked at by plural players.

9. The apparatus of claim 1, wherein determining that the first object has the first priority level comprises:

identifying that the first object is being interacted with by a computer game controller.

10. The apparatus of claim 1, wherein determining that the first object has the first priority level comprises:

identifying that the first object is a playable object.

11. The apparatus of claim 1, wherein determining that the first object has the first priority level comprises:

identifying that the first object is signaled by a game engine as having the first priority level.

12. The apparatus of claim 1, wherein determining that the first object has the first priority level comprises:

identifying that the first object is a statistics display region.

13. The apparatus of claim 1, wherein determining that the second object has the second priority level comprises:

identifying that the second object comprises text.

14. An apparatus comprising:

One or more non-transitory computer-readable media storing computer-readable instructions which, when executed by one or more processors, cause a system to perform operations comprising:

accessing a plurality of video frames of a video;

analyzing a video frame of the plurality of video frames to identify a plurality of objects in the video frame;

determining, for each respective object of the plurality of objects, a respective priority level for the respective object, wherein determining the respective priority level for the respective object comprises determining that a first object in the video frame has a first priority level and determining that a second object in the video frame has a second priority level lower than the first priority level;

encoding frames of the plurality of video frames that include the first object at a first resolution and frames of the plurality of video frames that include the second object at a second resolution; and transmitting the video to a client device according to the first resolution and second resolution.

15. The one or more non-transitory computer-readable media of claim 14, wherein the video comprises a computer game video.

16. The one or more non-transitory computer-readable media of claim 14, wherein the first priority level is higher than the second priority level and the first resolution is greater than the second resolution.

17. The one or more non-transitory computer-readable media of claim 14, wherein the operations further comprise:

encoding frames of the plurality of video frames that include the first object at a first frame rate and frames of the plurality of video frames that include the second object at a second frame rate.

18. A method, comprising:

accessing a plurality of video frames of a video;

analyzing a video frame of the plurality of video frames to identify a plurality of objects in the video frame;

determining, for each respective object of the plurality of objects, a respective priority level for the respective object, wherein determining the respective priority level for the respective object comprises determining that a first object in the video frame has a first priority level and determining that a second object in the video frame has a second priority level lower than the first priority level;

encoding frames of the plurality of video frames that include the first object at a first frame rate and frames of the plurality of video frames that include the second object at a second frame rate lower than the first frame rate; and transmit the video to a client device according to the first frame rate and second frame rate.

19. The method of claim 18, further comprising:

encoding respective frames of the plurality of video frames that include the first and second objects at respective first and second spatial resolutions.

20. The method of claim 18, further comprising:

encoding respective frames of the plurality of video frames that include the first and second objects at respective first and second temporal resolutions.

* * * * *